(12) United States Patent
Torrie et al.

(10) Patent No.: US 12,233,911 B2
(45) Date of Patent: Feb. 25, 2025

(54) AUTONOMOUS YARD TRUCK FOR MOVING A TRAILER

(71) Applicant: Autonomous Solutions, Inc., Mendon, UT (US)

(72) Inventors: Mitch Torrie, Mendon, UT (US); Devin Stewart, Mendon, UT (US); Eric Poulson, Mendon, UT (US); Mike McNees, Mendon, UT (US); Marlow Stevens, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 246 days.

(21) Appl. No.: 17/227,265

(22) Filed: Apr. 9, 2021

(65) Prior Publication Data

US 2021/0316761 A1   Oct. 14, 2021

Related U.S. Application Data

(60) Provisional application No. 63/008,605, filed on Apr. 10, 2020, provisional application No. 63/008,606, (Continued)

(51) Int. Cl.
| | |
|---|---|
| *B60W 60/00* | (2020.01) |
| *B60D 1/62* | (2006.01) |
| *B62D 53/12* | (2006.01) |

(52) U.S. Cl.
CPC .......... *B60W 60/0025* (2020.02); *B60D 1/62* (2013.01); *B62D 53/125* (2013.01); *B60W 2420/403* (2013.01)

(58) Field of Classification Search
CPC ......... B60W 60/0025; B60W 2420/42; B60W 2420/403; B60D 1/62; B60D 1/015;
(Continued)

(56) References Cited

U.S. PATENT DOCUMENTS

| | | |
|---|---|---|
| 2006/0071447 A1 | 4/2006 | Gehring et al. |
| 2009/0184490 A1 | 7/2009 | Alguera |

(Continued)

FOREIGN PATENT DOCUMENTS

| | | |
|---|---|---|
| DE | 102017109731 A1 | 11/2018 |

OTHER PUBLICATIONS

International Search Report and Written Opinion mailed dated Jul. 15, 2021 in PCT Application No. PCT/US2021/026735, 18 pages.
(Continued)

*Primary Examiner* — James J Lee
*Assistant Examiner* — Alexander George Matta

(57) ABSTRACT

Some embodiments include an autonomous yard truck that includes a speed control mechanism; a steering system; a geolocation sensor; a plurality of sensors; a fifth wheel coupling; a robotic arm disposed on the deck; an air hose with a first hose connector; a transceiver; and a controller. The controller may identify a first trailer hose connector location on a specific trailer; determine the location of a first hose connector on an autonomous yard truck; engage the first hose connector with a robotic arm; move the first hose connector from the first hose connector location to the first trailer hose connector location on the specific trailer with the robotic arm; connect the first hose connector with the first trailer hose connector; disengage the first hose connector from the robotic arm; and/or test the connection between the connection between the first hose connector and the first trailer hose connector.

11 Claims, 11 Drawing Sheets

Related U.S. Application Data filed on Apr. 10, 2020, provisional application No. 63/008,611, filed on Apr. 10, 2020.

(58) Field of Classification Search
CPC .. B62D 53/125; G05D 1/227; G05D 2105/28; G05D 2107/70; G05D 2109/10; G05D 1/2247; G05D 1/65; G05D 1/661
See application file for complete search history.

(56) References Cited

U.S. PATENT DOCUMENTS

| | | | |
|---|---|---|---|
| 2018/0091717 A1* | 3/2018 | Ion | H04N 23/75 |
| 2018/0188744 A1* | 7/2018 | Switkes | B60W 10/06 |
| 2018/0273034 A1* | 9/2018 | Gesch | B60W 30/146 |
| 2019/0064835 A1* | 2/2019 | Hoofard | B60T 7/22 |
| 2019/0302764 A1 | 10/2019 | Smith et al. | |
| 2019/0367105 A1 | 12/2019 | Grossman | |
| 2019/0382010 A1* | 12/2019 | Woodley | B60W 30/146 |
| 2020/0055357 A1 | 2/2020 | Aine | |
| 2020/0097021 A1* | 3/2020 | Carpenter | G05D 1/243 |
| 2020/0189591 A1* | 6/2020 | Mellinger, III | B62D 6/003 |
| 2021/0053407 A1* | 2/2021 | Smith | B25J 9/1697 |
| 2021/0185207 A1* | 6/2021 | Li | H04N 23/52 |

OTHER PUBLICATIONS

International Search Report and Written Opinion dated Jul. 15, 2021 as received in PCT Application No. PCT/US2021/026735, 18 pages.
International Preliminary Report on Patentablility mailed dated Oct. 6, 2022, in PCT Application No. PCT/US2021/026735, 16 pages.
Extended European search report dated Feb. 9, 2024, in EP Application No. 21784432.3, 10 pages.
Office Action dated Dec. 12, 2024, in EP Application No. 21784432.3, 13 pages.

* cited by examiner

AUTONOMOUS YARD TRUCK FOR MOVING A TRAILER

BACKGROUND

In normal operation, an autonomous vehicle may autonomously control its operation, for example, based on high level instructions. For instance, an autonomous vehicle may be capable of operating with limited or even no human direction beyond the high level instructions. As such, an autonomous vehicle may be utilized in a wide array of industrial operations such as those that are dangerous, dirty, and dull.

SUMMARY

Some embodiments may include a method for operating an autonomous yard truck. One method may include, for example, some of the following: receiving an instruction to move the autonomous yard truck toward a specific trailer; developing a first path for the autonomous yard truck to follow toward the specific trailer that takes into account the geometry of the autonomous yard truck; autonomously driving the autonomous yard truck along the first path toward the specific trailer; backing up the autonomous yard truck toward the specific trailer; engaging a fifth-wheel coupling of the autonomous yard truck with the kingpin of the specific trailer; engaging the brakes of the autonomous yard truck; identifying a first trailer hose connector location on the specific trailer; determining the location of a first hose connector on the autonomous yard truck; engaging the first hose connector with a robotic arm; moving the first hose connector from the first hose connector location to the first trailer hose connector location on the specific trailer with the robotic arm; connecting the first hose connector with the first trailer hose connector; disengaging the first hose connector from the robotic arm; testing the connection between the first hose connector and the first trailer hose connector; raising the fifth-wheel coupling; releasing the brakes; receiving an instruction to move the autonomous yard truck and the specific trailer to a location; developing a second path for the autonomous yard truck and the specific trailer to follow toward the location, wherein the second path is developed take into account at least the geometry of the yard truck and the geometry of the specific trailer; and/or autonomously driving the autonomous yard truck with the specific trailer along the second path toward the location.

In some embodiments, the method may include imaging the connection between the first hose connector and the first trailer hose connector.

In some embodiments, the method may include some of the following: identifying a second hose connector location on the specific trailer; determining the location of a second hose connector on the autonomous yard truck; engaging the second hose connector with the robotic arm; moving the second hose connector from the second hose connector location to the second trailer hose connector location on the specific trailer with the robotic arm; connecting the second hose connector with the second trailer hose connector; imaging the connection between the second hose connector and the second trailer hose connector; disengaging the second hose connector from the robotic arm; and/or testing the connection between the second hose connector and the second trailer hose connector.

In some embodiments, the method may include deploying a shade.

In some embodiments, the backing up the autonomous yard truck toward the specific trailer may occur autonomously.

In some embodiments the backing up the autonomous yard truck toward the specific trailer may occur via teleoperation.

Some embodiments may include a method for operating an autonomous yard truck. One method may include, for example, some of the following: receiving an instruction to move the autonomous yard truck with a trailer toward a location; developing a first path for the autonomous yard truck and the trailer to follow toward the location, wherein the first path is developed take into account at least the length of the trailer; autonomously driving the autonomous yard truck and the trailer along the first path toward the location; parking the autonomous yard truck and the trailer; engaging the brakes of the autonomous yard truck; lowering the fifth-wheel coupling; identifying a first trailer hose connector location on the trailer; moving a robotic arm to the first trailer hose connector location; disengaging a first hose connector from the first trailer hose connector with the robotic arm; determining a storage location for the first hose connector on the autonomous yard truck; releasing the first hose connector; disengaging the autonomous yard truck with the kingpin of the specific trailer; receiving an instruction to move the autonomous yard truck to a second location; developing a second path for the autonomous yard truck to follow toward the second location, wherein the second path is developed take into account the geometry of the autonomous yard truck without the trailer; releasing the brakes; and/or autonomously driving the autonomous yard truck along the second path toward the second location.

The method may include some or all of the following: identifying a second trailer hose connector location on the trailer; moving a robotic arm to the second trailer hose connector location; disengaging a second hose connector from the second trailer hose connector with the robotic arm; determining a storage location for the second hose connector on the autonomous yard truck; and releasing the second hose connector.

Some embodiments may include an autonomous yard truck. The autonomous yard truck, for example, may include a speed control mechanism; a steering system; a geolocation sensor that can produce autonomous yard truck geolocation data; a plurality of sensors positioned on the autonomous yard truck; a fifth wheel coupling; a robotic arm disposed on the deck; an air hose with a first hose connector; a transceiver that communicates with and receive data from at least a base station; and/or a controller communicatively coupled with the speed control mechanism, the steering system, the geolocation sensor, the plurality of sensors, the robotic arm, the transceiver. The controller, for example, may have code that: receives an instruction to move the autonomous yard truck toward a specific trailer; develops a first path for the autonomous yard truck to follow toward the specific trailer that takes into account the geometry of the autonomous yard truck; autonomously drives the autonomous yard truck along the first path toward the specific trailer; engages a fifth-wheel coupling of the autonomous yard truck with the kingpin of the specific trailer; engages the brakes of the autonomous yard truck; identifies a first trailer hose connector location on the specific trailer; determines the location of a first hose connector on the autonomous yard truck; engages the first hose connector with a robotic arm; moves the first hose connector from the first hose connector location to the first trailer hose connector location on the specific trailer with the robotic arm; connects the first hose connector with the first trailer hose connector; disengages the first hose connector from the robotic arm; tests the connection between the first hose connector and the first trailer hose connector; raises the fifth-wheel coupling; releases the brakes; receives an instruction to move the autonomous yard truck and the specific trailer to a location; develops a second path for the autonomous yard truck and the specific trailer to follow toward the location, wherein the second path is developed take into account at least the geometry of the yard truck and the geometry of the specific trailer; and/or autonomously drives the autonomous yard truck puling the specific trailer along the second path toward the location.

In some embodiments, the controller may have code that backs up the autonomous yard truck toward the specific trailer.

In some embodiments, the controller may have code that allows teleoperation of the yard truck.

In some embodiments, the autonomous yard truck may include a deployable shade; and the controller may have code to deploy the deployable shade In some embodiments, the controller may have code that identifies a second hose connector location on the specific trailer; determines the location of a second hose connector on the autonomous yard truck; engages the second hose connector with the robotic arm; moves the second hose connector from the second hose connector location to the second trailer hose connector location on the specific trailer with the robotic arm; connects the second hose connector with the second trailer hose connector; images the connection between the second hose connector and the second trailer hose connector; disengages the second hose connector from the robotic arm; and/or tests the connection between the second hose connector and the second trailer hose connector.

In some embodiments, the controller may have code that images the connection between the first hose connector and the first trailer hose connector.

Some embodiments may include a method for operating an autonomous yard truck. One method may include, for example, some of the following: receiving an instruction to move the autonomous yard truck toward a specific trailer; developing a first path for the autonomous yard truck to follow toward the specific trailer that takes into account the geometry of the autonomous yard truck; autonomously driving the autonomous yard truck along the first path toward the specific trailer; backing up the autonomous yard truck toward the specific trailer; engaging a fifth-wheel coupling of the autonomous yard truck with the kingpin of the specific trailer; instructing the brake system to engage the brakes of the autonomous yard truck; instructing a robotic arm to connect a first hose connector with a first trailer hose connector; instructing the brake system to test the connection between the first hose connector and the first trailer hose connector; raising the fifth-wheel coupling; instructing the brake system to release the brakes of the autonomous yard truck; receiving an instruction to move the autonomous yard truck and the specific trailer to a location; developing a second path for the autonomous yard truck and the specific trailer to follow toward the location, wherein the second path is developed take into account at least the geometry of the yard truck and the geometry of the specific trailer; and/or autonomously driving the autonomous yard truck puling the specific trailer along the second path toward the location.

The method may include deploying a shade.

In some embodiments, backing up the autonomous yard truck toward the specific trailer may occur autonomously.

In some embodiments, backing up the autonomous yard truck toward the specific trailer may occur via teleoperation.

The method may include instructing the robotic arm to connect a second hose connector with a second trailer hose connector.

The method may include instructing the brake system to test the connection between the second hose connector and the second trailer hose connector.

Some embodiments may include an autonomous yard truck. The autonomous yard truck, for example, may include a speed control mechanism; a steering system; a geolocation sensor that can produce autonomous yard truck geolocation data; a plurality of sensors positioned on the autonomous yard truck; a fifth wheel coupling; a robotic arm disposed on the deck; an air hose with a first hose connector; a transceiver that communicates with and receive data from at least a base station; and/or a controller communicatively coupled with the speed control mechanism, the steering system, the geolocation sensor, the plurality of sensors, the robotic arm, the transceiver. The controller may include code that receives an instruction to move the autonomous yard truck toward a specific trailer; develops a first path for the autonomous yard truck to follow toward the specific trailer that takes into account the geometry of the autonomous yard truck; autonomously drives the autonomous yard truck along the first path toward the specific trailer; engages a fifth-wheel coupling of the autonomous yard truck with the kingpin of the specific trailer; instructs the brake system to engage the brakes of the autonomous yard truck; instructs a robotic arm to connect a first hose connector with a first trailer hose connector; instructs the brake system to test the connection between the first hose connector and the first trailer hose connector; raises the fifth-wheel coupling; instructs the brake system to release the brakes of the autonomous yard truck; receives an instruction to move the autonomous yard truck and the specific trailer to a location; develops a second path for the autonomous yard truck and the specific trailer to follow toward the location, wherein the second path is developed take into account at least the geometry of the yard truck and the geometry of the specific trailer; and/or autonomously drives the autonomous yard truck puling the specific trailer along the second path toward the location.

In some embodiments, the controller may include code that instructs the robotic arm to connect a second hose connector with a second trailer hose connector.

In some embodiments, the controller may include code that instructs the brake system to test the connection between the first hose connector and the first trailer hose connector, and test the connection between the second hose connector and the second trailer hose connector.

In some embodiments, the controller may include code that backs up the autonomous yard truck toward the specific trailer.

In some embodiments, the controller may include code that to allow teleoperation of the yard truck.

In some embodiments, the autonomous vehicle may include a deployable shade; and wherein the controller has code to deploy the deployable shade Some embodiments may include a method for operating an autonomous yard truck. One method may include, for example, some of the following identifying a first trailer hose connector location on a specific trailer; determining the location of a first hose connector on an autonomous yard truck; engaging the first hose connector with a robotic arm; moving the first hose connector from the first hose connector location to the first trailer hose connector location on the specific trailer with the robotic arm; connecting the first hose connector with the first trailer hose connector; disengaging the first hose connector from the robotic arm; and/or testing the connection between the connection between the first hose connector and the first trailer hose connector.

In some embodiments, the method may include imaging the connection between the first hose connector and the first trailer hose connector.

In some embodiments, the method may include identifying a second hose connector location on the specific trailer; determining the location of a second hose connector on the autonomous yard truck; engaging the second hose connector with the robotic arm; moving the second hose connector from the second hose connector location to the second trailer hose connector location on the specific trailer with the robotic arm; connecting the second hose connector with the second trailer hose connector; and/or disengaging the second hose connector from the robotic arm.

In some embodiments, the method may include imaging the connection between the second hose connector and the second trailer hose connector.

Some embodiments may include an autonomous yard truck. The autonomous yard truck, for example, may include a speed control mechanism; a steering system; a geolocation sensor that can produce autonomous yard truck geolocation data; a plurality of sensors positioned on the autonomous yard truck; a fifth wheel coupling; a robotic arm disposed on the deck; an air hose with a first hose connector; a transceiver that communicates with and receive data from at least a base station; and/or a controller communicatively coupled with the speed control mechanism, the steering system, the geolocation sensor, the plurality of sensors, the robotic arm, the transceiver. The controller has code that identifies a first trailer hose connector location on a specific trailer; determines the location of a first hose connector on an autonomous yard truck; engages the first hose connector with a robotic arm; moves the first hose connector from the first hose connector location to the first trailer hose connector location on the specific trailer with the robotic arm; connects the first hose connector with the first trailer hose connector; disengages the first hose connector from the robotic arm; and/or tests the connection between the connection between the first hose connector and the first trailer hose connector.

In some embodiments controller has code that images the connection between the first hose connector and the first trailer hose connector.

In some embodiments, the controller has code that: identifies a second hose connector location on the specific trailer; determines the location of a second hose connector on the autonomous yard truck; engages the second hose connector with the robotic arm; moves the second hose connector from the second hose connector location to the second trailer hose connector location on the specific trailer with the robotic arm; connects the second hose connector with the second trailer hose connector; images the connection between the second hose connector and the second trailer hose connector; and/or disengages the second hose connector from the robotic arm.

DETAILED DESCRIPTION

Figure 1:
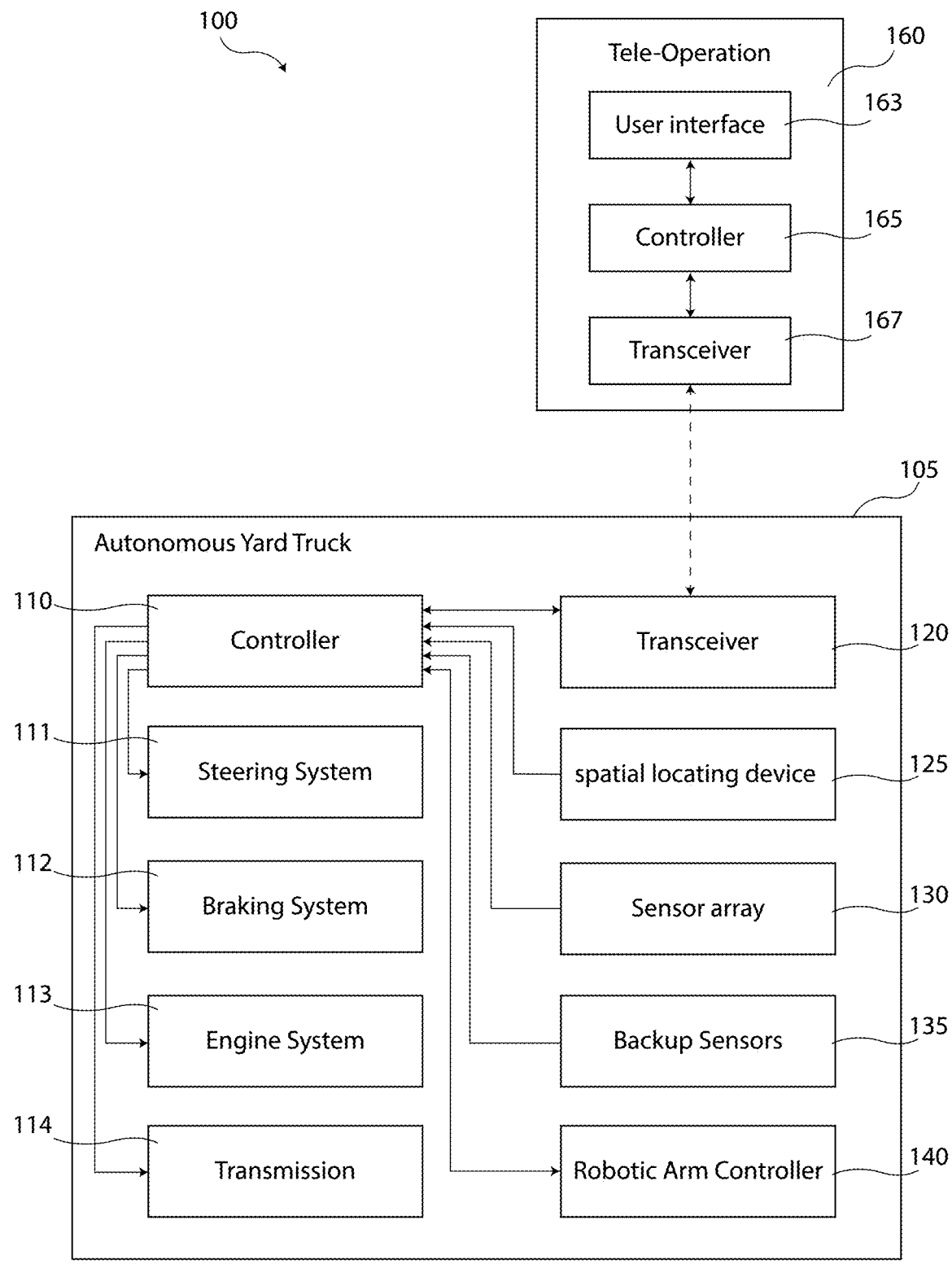
FIG. 1 is a block diagram of an autonomous yard truck system according to some embodiments.

FIG. 1 is a block diagram of an autonomous yard truck system 100 that includes a base station 160 and an autonomous yard truck 105. The autonomous yard truck 105, for example, may be any type of autonomous yard truck such as, for example, the autonomous yard truck shown in FIG. 2.

In some embodiments, the autonomous yard truck 105 may include a controller 110 that may be mounted on or within the autonomous yard truck 105. In some embodiments, the controller 110 may include any or all components of computational unit 1100 shown in FIG. 11.

In some embodiments, the controller 110 may be communicatively coupled with a vehicle transceiver 120, a spatial locating device 125, a steering control system 111, a braking control system 112, an engine control system 113, a transmission control system 114, and/or a robotic arm controller 140. In some embodiments, the controller 110 may be integrated into a single control system. In some embodiments, the controller 110 may interact directly with one or more mechanical components using a ISOBUS or CAN bus interface. In other embodiments, the controller 110 may include a plurality of distinct control systems. In some embodiments, the controller 110 may include any or all the components show in FIG. 11. In some embodiments, the yard truck 105 may include an interface to control the raising and lowering of a fifth-wheel connector.

The autonomous yard truck 105, for example, may also include a spatial locating device 125 that determines a position of the autonomous yard truck 105 as well as a heading and a speed of the autonomous yard truck 105. The spatial locating device 125, for example, may include any suitable system that determines the position and/or other characteristics of the autonomous yard truck 105, such as a global positioning system (GPS), a global navigation satellite system (GNSS), or the like. In some embodiments, the spatial locating device 125 may determine the position and/or other characteristics of the autonomous yard truck 105 relative to a fixed point within a field (e.g., via a fixed radio transceiver). In some embodiments, the spatial locating device 125 may determine the position of the autonomous yard truck 105 relative to a fixed global coordinate system using GPS, GNSS, a fixed local coordinate system, or any combination thereof. In some embodiments, the spatial locating device 125 may include any or all components of computational unit 1100 shown in FIG. 11.

In some embodiments, the autonomous yard truck 105 may include a steering control system 111 that controls the direction of the autonomous yard truck 105. The steering control system 111, for example, may control the steering of the autonomous yard truck 105 and/or a trailer coupled with the autonomous yard truck 105. The steering control system 111, for example, may include a separate controller from the controller 110.

In some embodiments, the autonomous yard truck 105 may include a braking control system 112 that controls a speed of the autonomous yard truck 105. The braking control system 112, for example, may control the brakes on the autonomous yard truck 105 and/or a trailer coupled with the autonomous yard truck 105. The braking control system 112, for example, may include a separate controller from the controller 110.

The braking control system 112, for example, may receive input from the controller 110 that instruct the braking control system 112 to either engage or disengage the brakes of the autonomous yard truck 105, the brakes of a trailer coupled with the autonomous yard truck 105, an emergency brake of the autonomous yard truck 105, and/or an emergency brake of a trailer coupled with the autonomous yard truck 105. The braking control system 112 may control the delivery of air pressure that is applied from a compressor to the brakes of the autonomous yard truck 105, the brakes of a trailer coupled with the autonomous yard truck 105, an emergency brake of the autonomous yard truck 105, and/or an emergency brake of a trailer coupled with the autonomous yard truck 105.

In some embodiments, the autonomous yard truck 105 may include an engine control system 113 according to some embodiments. The engine control system 113, for example, may control various aspects of engine of the autonomous yard truck 105 such as, for example, the throttle, choke, ignition, fuel/air mixture, timing of the engine, injection timing, injection pressure, exhaust recirculation, wastegate actuation, rail pressure, diesel exhaust fluid injection, etc. The engine control system 113, for example, may include a separate controller from the controller 110. The engine control system 113, for example, may receive input from the controller 110 that instruct the engine control system 113

In some embodiments, the autonomous yard truck 105 may include a transmission control system 114 according to some embodiments. The transmission control system 114, for example, may control the shifting of gears of the transmission of the autonomous yard truck 105. The transmission control system 114, for example, may include a separate controller from the controller 110.

In some embodiments, the braking control system 112, the engine control system 113, and/or the transmission control system 114 may include a single controller as part of controller 110 or as a separate controller.

In some embodiments, the controller 110 may receive signals from either or both the base station 160. These signals, for example, may parameters regarding vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof. These signals may, for example, include path information that the controller uses to direct the autonomous yard truck 105. These signals may, for example, include specific control parameters for various subsystems.

In some embodiments, the robotic arm controller 140 may control various parameters of a robotic arm integrated within the autonomous yard truck 105. For example, the robotic arm controller 140 may instruct the robotic arm via a communication link, such as a CAN bus or ISOBUS or any other communication networks such as, for example, ethernet, Wi-Fi, Bluetooth, Broad R, LTE, 5G, etc. to perform various action such as, for example, engage and disengage hose connectors from the trailer, remove hose connectors from a connector rack, and/or place hose connectors on the connector rack. As another example, the robotic arm controller 140 may control operation of a camera (or other visual sensor) coupled with the robotic arm.

In some embodiments, the autonomous yard truck 105 may include a sensor array 130. In some embodiments, the sensor array 130 may facilitate determination of condition(s) of the autonomous yard truck 105 and/or the work area. For example, the sensor array 130 may include multiple sensors (e.g., infrared sensors, ultrasonic sensors, magnetic sensors, radar sensors, Lidar sensors, terahertz sensors, sonar sensors, cameras, etc.) that monitor a rotation rate of a respective wheel or track and/or a ground speed of the autonomous yard truck 105. The sensors may also monitor operating levels (e.g., temperature, fuel level, etc.) of the autonomous yard truck 105. Furthermore, the sensors may monitor conditions in and around the work area, such as temperature, weather, wind speed, humidity, and other conditions. In some embodiments, the sensors may detect physical objects in the work area, such as the parking stall, the material stall, accessories, other vehicles, other obstacles, or other object(s) that may in the area surrounding the autonomous yard truck 105. Further, the sensor array 130 may be utilized by the first obstacle avoidance system, the second obstacle avoidance system, or both.

In some embodiments, the sensor array 130 may include a video camera placed on the rear of the autonomous yard truck 105 that provides a view of the autonomous yard truck 105 as it is being backed up. In some embodiments, the sensor array 130 may include a camera located on a robotic arm. In some embodiments, the sensor array 130 may include a sensor that detects a connection or a disconnection between the fifth-wheel coupling of the autonomous yard truck with the kingpin of the trailer.

In some embodiments, the autonomous yard truck system 100 may include a base station 160 that is located remotely from the autonomous yard truck 105. In some embodiments, some functions, processes, algorithms, methods, etc. described in this document may be distributed between the controller 110 and a base station controller 165. The base station 160 may communicate with the autonomous yard truck 105 via base station transceiver 167. For example, the base station controller 165 may provide a path between two points that the autonomous yard truck 105 is expected to take, and the controller 110 may provide the instructions to the various components of the yard truck to proceed along the path. In some embodiments, either the controller 110 or the base station controller 165 may adjust a path based on whether the autonomous yard truck 105 is or is not pulling a trailer.

For example, In some embodiments, a vehicle transceiver 120 positioned on the autonomous yard truck 105 may output signals indicative of vehicle characteristics (e.g., position, speed, heading, curvature rate, curvature rate limits, maximum turning rate, minimum turning radius, steering angle, roll, pitch, rotational rates, acceleration, images, video, position relative to a trailer, etc.) to the base station 160 via a base station transceiver 167. In some embodiments, the base station controller 165 may calculate drivable path plans and/or output control signals to control the steering control system 111, the braking control system 112, the engine control system 113, the transmission control system 114, and/or the robotic arm controller 140.

In some embodiments, the base station 160 may include a user interface 163. The user interface may allow a user to remotely operate (e.g., teleoperation) the autonomous yard truck 105. For example, the controller 110 may communicate various vehicle characteristics to the base station 160. In some embodiments, the controller 110 may stream video data to the base station 160. The user, via the user interface 163, may operate the autonomous yard truck by communicating operational parameters to the yard truck 105. The operational parameters may include steering parameters, braking parameters, engine parameters, transmission parameters, and/or robotic arm parameters.

The controller 110 may take the operational parameters and communicate steering parameters to the steering control system 111, braking parameters to the braking control system 112, engine parameters to the engine control system 113, transmission parameters to the transmission control system 114, and/or robotic arm parameters to the robotic arm controller 140.

For example, the autonomous yard truck 105 may encounter an obstacle that it is unable to autonomously navigate around. The autonomous yard truck 105 may stop operation and send an indication to the base station 160 that the autonomous yard truck 105 needs user assistance. In response, a user may take over operation of the autonomous yard truck 105 via the user interface 163 (and/or the controller 165 and/or the base station transceiver 167). The user may navigate the autonomous yard truck around the obstacle and return control of the autonomous yard truck 105 to autonomous driving.

As another example, the autonomous yard truck 105 may autonomously position itself in front of a trailer. The autonomous yard truck 105 may stop operation and send an indication to the base station 160 that the autonomous yard truck 105 needs user assistance to back the yard truck to the trailer. In response, a user may take over operation of the autonomous yard truck 105 via the user interface 163 (and/or the controller 165 and/or the base station transceiver 167). The user may control the autonomous yard truck to back it up to the trailer and engage the fifth-wheel coupling of the autonomous yard truck with the kingpin of the trailer. Once engaged, the user may return control of the autonomous yard truck 105 to autonomous driving.

Figure 2:
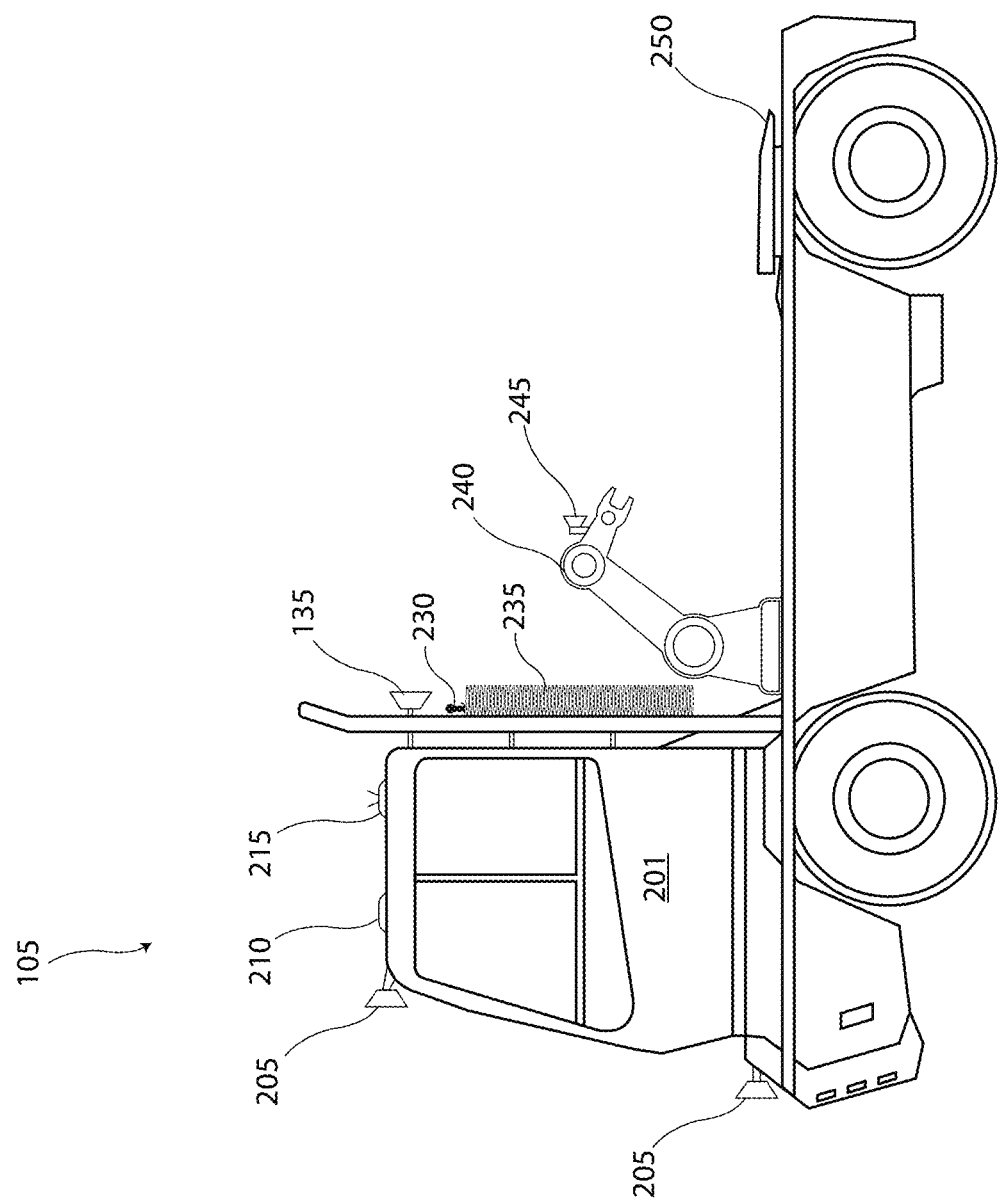
FIG. 2 is a side view of an autonomous yard truck according to some embodiments.
Figure 3:
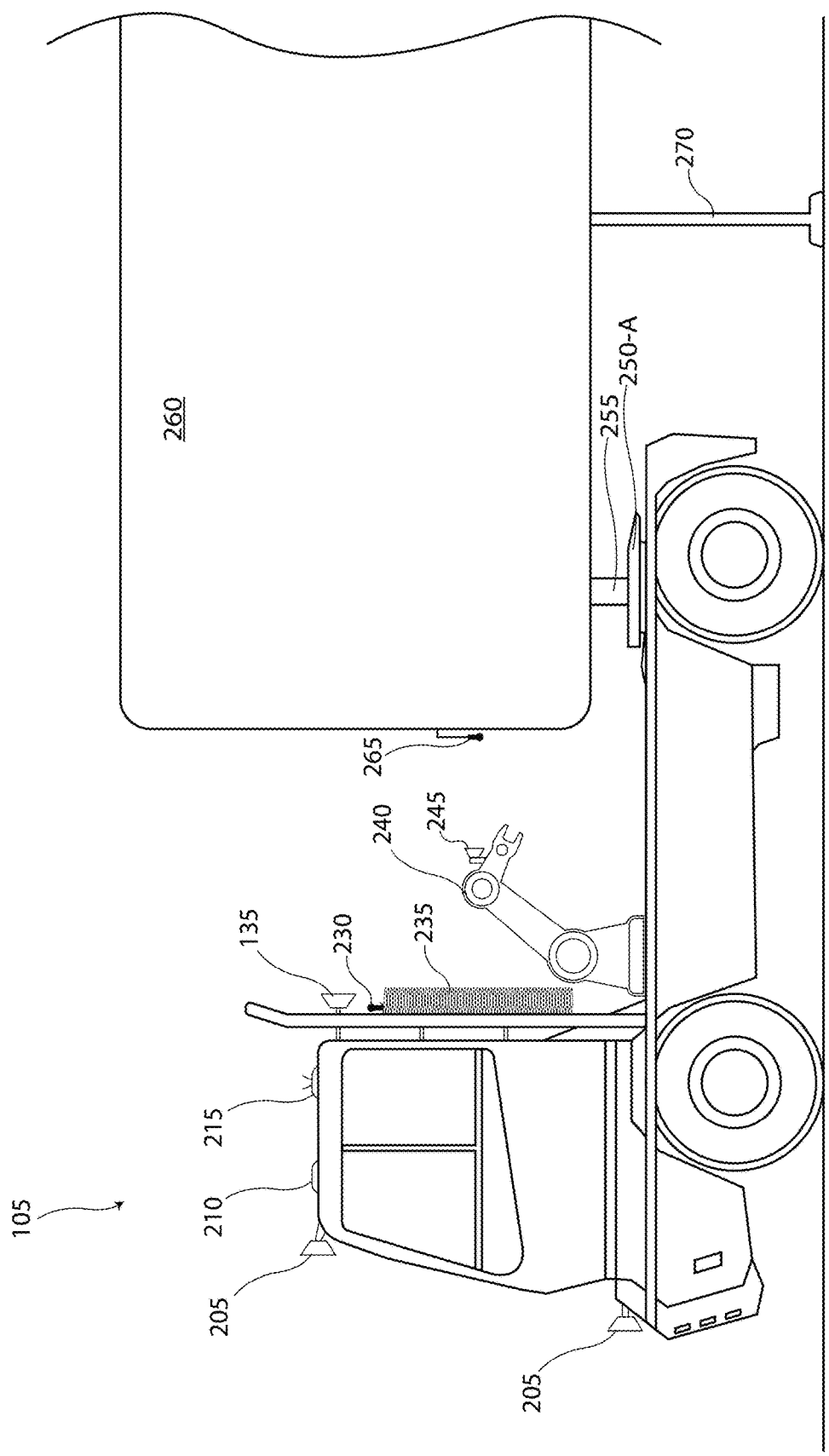
FIG. 3 is a side view of an autonomous yard truck coupled with a trailer according to some embodiments.

FIG. 2 is a side view of an autonomous yard truck 105 according to some embodiments. And FIG. 3 is a side view of an autonomous yard truck 105 coupled with a trailer 260 according to some embodiments.

The autonomous yard truck 105 includes a cab 201 that may be used to drive the autonomous yard truck 105 manually. The autonomous yard truck 105 may include one or more controllers as shown in FIG. 1. The autonomous yard truck 105 may also include a brake system, an engine, a transmission, steering, etc.

In some embodiments, the autonomous yard truck 105 may include a sensor array that includes sensors 205 (e.g., sensor array 130) disposed at various locations on the autonomous yard truck 105 such as, for example, on the cab 201, bumper, housing, frame, etc. The sensors 205 may include infrared sensors, ultrasonic sensors, magnetic sensors, radar sensors, Lidar sensors, terahertz sensors, sonar sensors, cameras, etc. The autonomous yard truck 105 may also include one or more backup sensors 135 such as, for example, infrared sensors, ultrasonic sensors, magnetic sensors, radar sensors, Lidar sensors, terahertz sensors, sonar sensors, cameras, etc.

In some embodiments, the autonomous yard truck 105 may include a spatial locating device (or GPS) antenna 210. In some embodiments, the autonomous yard truck 105 may include a transceiver antenna 215.

In some embodiments, the autonomous yard truck 105 may include one or more hoses 235 that can be connected with the trailer 260 such as, for example, two or three hoses. Each hose may have a hose connector 230 that can be connected with a trailer hose connector 265. For example, the autonomous yard truck 105 may include a service brake hose, an emergency brake hose, and/or a refrigerant hose.

In some embodiments, the autonomous yard truck 105 may include a robotic arm 240 disposed on the back bed of the autonomous yard truck 105. The robotic arm 240 may include any type of robotic arm. The robotic arm 240, for example, may exert high torque or high pressure sufficient to connect the hose connector 230 with the trailer hose connector 265. The hose connector 230 and/or the trailer hose connector 265 may comprise a glad-hand connector. In some embodiments, when the autonomous yard truck 105 is not coupled with a trailer 260, the hose connector 230 may be positioned in a storage rack at some point on the autonomous yard truck 105 such as, for example, on the rear of the cab 201.

In some embodiments, the robotic arm 240 may include one or more arm sensors 245 such as, for example, infrared sensors, ultrasonic sensors, magnetic sensors, radar sensors, Lidar sensors, terahertz sensors, sonar sensors, cameras, etc. The arm sensor 245, for example, may produce data that can be used to identify the location of a hose connector 230 and/or a trailer hose connector 265. The arm sensor 245, for example, may produce data that can show that a hose connector 230 and/or a trailer hose connector 265 are sufficiently coupled.

In some embodiments, the autonomous yard truck 105 may include a fifth-wheel coupling 250. The fifth-wheel coupling 250, for example, may be raised or lowered with a fifth-wheel coupling boom. FIG. 2 shows the fifth-wheel coupling 250 in a lowered position. The fifth-wheel coupling 250 may couple with a kingpin 255 of a trailer 260.

Figure 5:
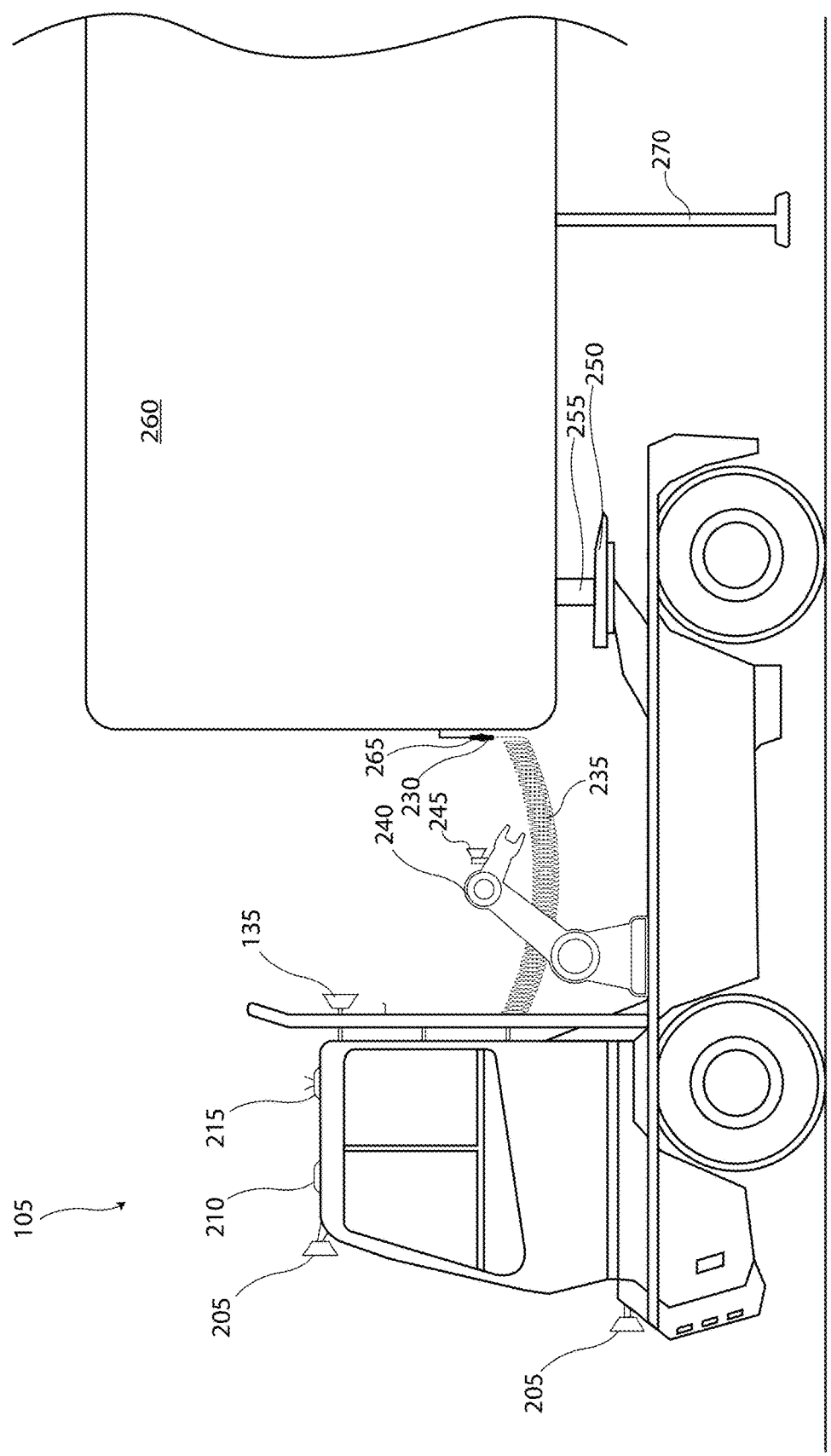
FIG. 5 is a side view of an autonomous yard truck coupled with a trailer according to some embodiments.

When the fifth-wheel coupling 250 is coupled with a kingpin 255 and the fifth-wheel coupling 250 is in the raised fifth-wheel coupling 250 position, the trailer legs 270 may lifted off the ground as shown in FIG. 5. This may allow the autonomous yard truck 105 to pull the trailer 260 without individually raising the trailer legs 270.

In some embodiments, the robotic arm 240 and/or the arm sensor 245 may be coupled with a thermal management system. A thermal management system may, for example, be coupled with a thermal management system associated with the autonomous yard truck 105 such as, for example, coupled with the cab heating/cooling system and/or the engine heating/cooling system. A thermal management system may, for example, be an independent system that heats and/or cools the robotic arm 240 and/or the arm sensor 245. A thermal management system may, for example, keep the temperature of the robotic arm 240 and/or the arm sensor 245 between about 32° F. and about 100° F.

In some embodiments, as shown in FIG. 12, the autonomous yard truck 105 may include a deployable shade 277 coupled with the back 287 of the cab 201. The deployable shade 277, for example, may be used to screen the sun and/or other lighting from the arm sensor 245 and/or the one or more backup sensors 135. The deployable shade 277, for example, may include an umbrella configuration or an awning configuration. The deployable shade 277, for example, may be coupled with the roof or an upper portion of the cab.

In some embodiments, a deployable shade 277 may be deployed before and/or during operation of the robotic arm 240.

In some embodiments, a deployable shade 277 may be deployed during operation of at least block 635 through block 645 of process 600; during operation of at least block 705 through block 775 of process 700; during operation of at least block 835 through block 880 of process 800; during operation of at least block 935 through block 970 of process 900; and. during operation of at least block 1035 through block 1045 of process 1000. During other times, for example, the deployable shade 277 may be retracted.

In some embodiments, the deployable shade 277 may be deployed prior to or in conjunction with block 635 and/or after or in conjunction with block 630 in process 600. In some embodiments, the deployable shade 277 may be deployed prior to or in conjunction with block 705 in process 700. In some embodiments, the deployable shade 277 may be deployed prior to or in conjunction with block 835 and/or after or in conjunction with block 830 in process 800. In some embodiments, the deployable shade 277 may be deployed prior to or in conjunction with block 935 and/or after or in conjunction with block 930 in process 900.

In some embodiments, the deployable shade 277 may be retracted after or in conjunction with block 645 and/or prior to or in conjunction with block 650 in process 600. In some embodiments, the deployable shade 277 may be retracted after or in conjunction with block 775 in process 700. In some embodiments, the deployable shade 277 may be retracted after or in conjunction with block 880 and/or prior to or in conjunction with block 885 in process 800. In some embodiments, the deployable shade 277 may be retracted after or in conjunction with block 975 and/or prior to or in conjunction with block 980 in process 600.

Figure 4:
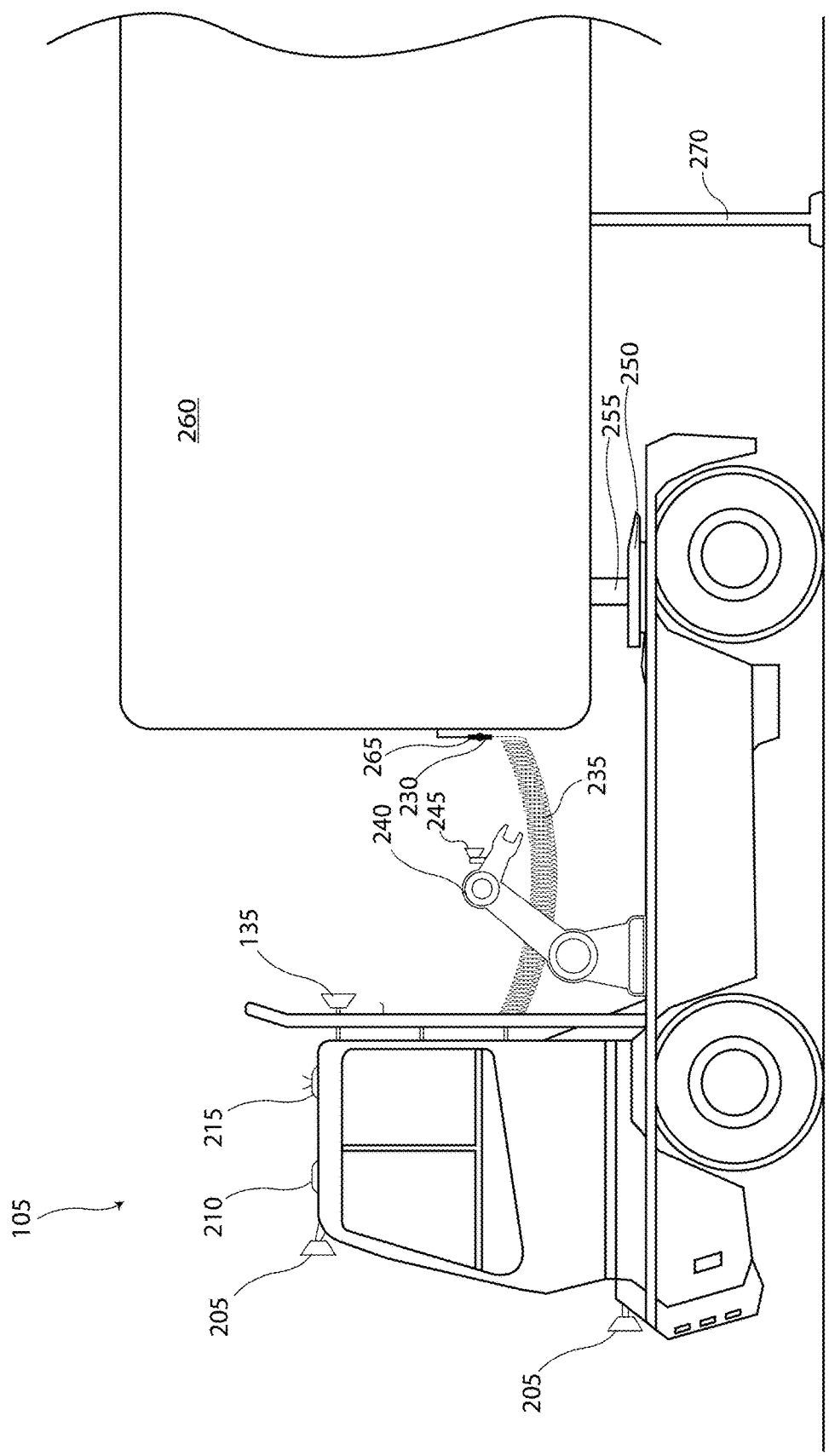
FIG. 4 is a side view of an autonomous yard truck coupled with a trailer according to some embodiments.

FIG. 3 is a side view of the autonomous yard truck 105 coupled with the trailer 260 prior to connecting the one or more hoses 235. FIG. 4 is a side view of the autonomous yard truck 105 coupled with the trailer 260 with the one or more hoses 235 connected with the trailer. FIG. 5 is a side view of the autonomous yard truck 105 coupled with the trailer 260 and with a raised fifth-wheel coupling 250.

Figure 6:
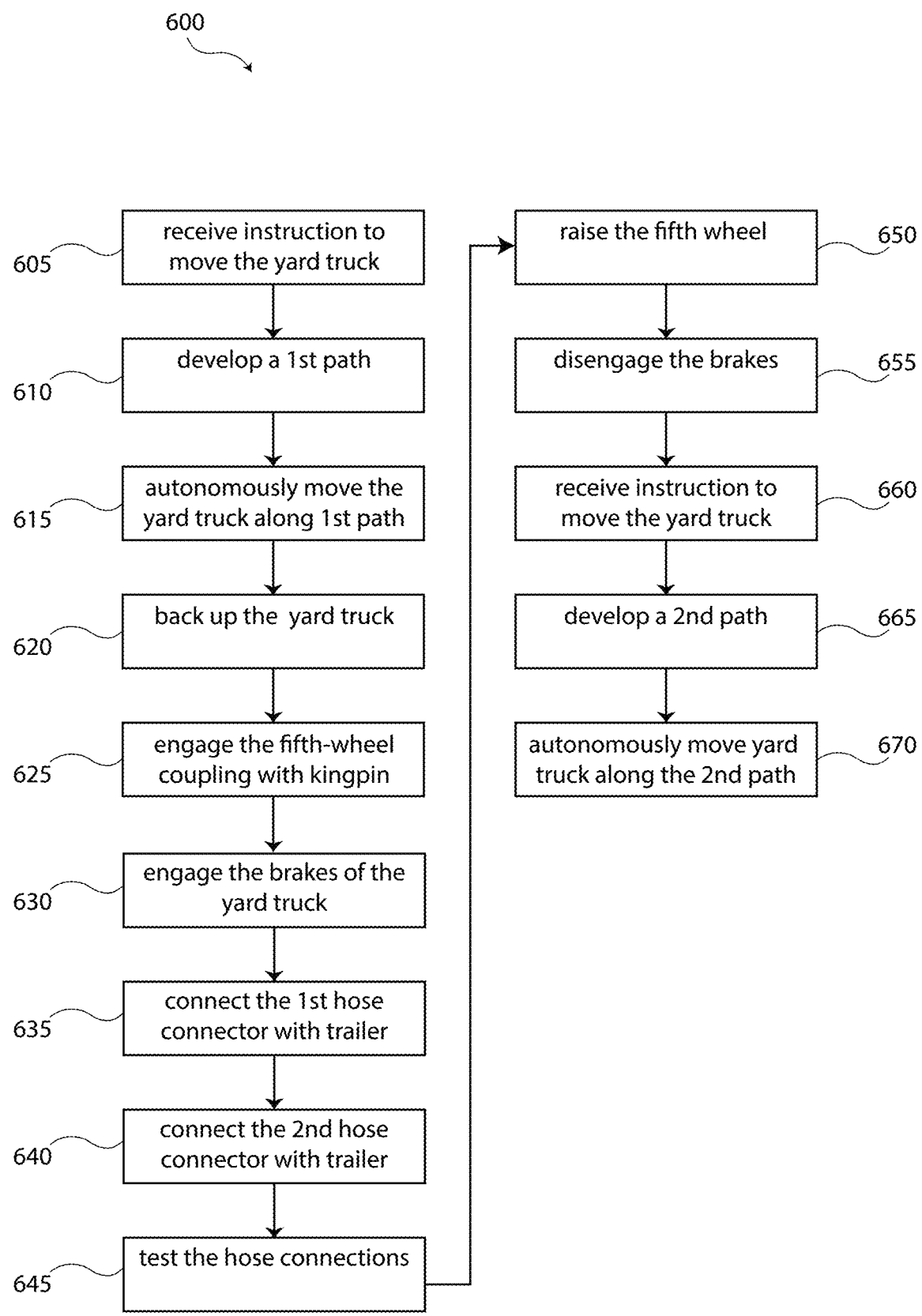
FIG. 6 is a flowchart of a process for operating an autonomous yard truck according to some embodiments.

FIG. 6 is a flowchart of a process 600 for operating an autonomous yard truck according to some embodiments. The process 600 may, for example, include more or fewer blocks than shown. In addition, the blocks of process 600 may be performed in any order, some blocks may be performed at the same time, and/or one or more blocks may be removed or not performed. Furthermore, one or more additional blocks or processes may occur between the blocks or in addition to one or more blocks. The blocks of process 600 may be executed by the same or different components, controllers, systems, etc. that may or may not be working together.

The process 600 may begin at block 605 where the autonomous yard truck 105 receives an instruction to move the autonomous yard truck toward a specific trailer. The instruction, for example, may be received from the base station 160 or from a remote location. The instruction, for example, may be received at the base station 160 and/or at the autonomous yard truck 105.

At block 610, a first path may be developed for the autonomous yard truck 105 to follow toward the specific trailer that takes into account the geometry of the autonomous yard truck. For example, the first path may take into account that the autonomous yard truck 105 is not coupled with a trailer and may have a shorter turning radius, may travel at higher speeds, may accelerate more quickly, etc. The first path may be developed at the base station 160 or at the autonomous yard truck 105. The first path may place the autonomous yard truck 105 in front of a trailer.

At block 615 the autonomous yard truck 105 may autonomously drive along the first path toward the specific trailer.

At block 620, the autonomous yard truck 105 may back up toward the specific trailer. In some embodiments, the autonomous yard truck 105 may back up toward the trailer autonomously. In some embodiments, the autonomous yard truck 105 may be backed up toward the trailer via teleoperation from a user at the base station 160.

At block 625 the fifth-wheel coupling of the autonomous yard truck may be coupled with the kingpin of the specific trailer.

At block 630, the brakes of the autonomous yard truck 105 may be engaged. In some embodiments, instruction may be sent from the controller 110 to the braking control system 112 to engage the brakes of the autonomous yard truck 105.

At block 635, the robotic arm 240 may connect a first hose connector with a first trailer hose connector. In some embodiments, instruction may be sent from the controller 110 to the robotic arm controller 140 instructing the robotic arm to connect the first hose connector with the first trailer hose connector. In some embodiments, this may include finding the first hose connector on the back of the autonomous yard truck 105 using images from arm sensor 245. In some embodiments, this may include coupling glad hands together to make the connection between the first hose connector and the first trailer hose connector. In some embodiments, this may include determining the position of the first trainer hose connector using. In some embodiments, this may include determining the color of the first hose connector and the first trailer hose connector.

At block 640, the robotic arm 240 may connect a second hose connector with a second trailer hose connector. In some embodiments, instruction may be sent from the controller 110 to the robotic arm controller 140 instructing the robotic arm to connect the second hose connector with the second trailer hose connector. In some embodiments, this may include finding the second hose connector on the back of the autonomous yard truck 105. In some embodiments, this may include coupling glad hands together to make the connection between the second hose connector and the second trailer hose connector. In some embodiments, this may include determining the position of the second trainer hose connector. In some embodiments, this may include determining the color of the second hose connector and the second trailer hose connector.

At block 645, the brake system may test the connection between the first hose connector and the first trailer hose connector and/or test the connection between the second hose connector and the second trailer hose connector. In some embodiments, instruction may be sent from the controller 110 to the braking control system 112 to test the connection between the first hose connector and the first trailer hose connector and/or test the connection between the second hose connector and the second trailer hose connector.

At block 650, the fifth-wheel coupling may be raised. In some embodiments, the controller 110 may send instructions to the autonomous yard truck 105 to raise the fifth-wheel coupling.

At block 655, the brakes of. the autonomous yard truck 105 may be disengaged. In some embodiments, instruction may be sent from the controller 110 to the braking control system 112 to disengage the brakes of the autonomous yard truck 105.

At block 660 the autonomous yard truck 105 receives an instruction to move the autonomous yard truck 105 and the trailer 260 toward a specific location. The instruction, for example, may be received from the base station 160 or from a remote location. The instruction, for example, may be received at the base station 160 and/or at the autonomous yard truck 105.

At block 665, a second path may be developed for the autonomous yard truck 105 and the trailer 260 to follow toward the specific location that takes into account the geometry of the autonomous yard truck coupled with the trailer 260. For example, the second path may take into account that the autonomous yard truck 105 is coupled with a trailer and may have a wider turning radius, may travel at lower speeds, may accelerate less quickly, etc. The second path may be developed at the base station 160 or at the autonomous yard truck 105. The second path may place the autonomous yard truck 105 at a location where the trailer 260 is being stored, loaded, transferred, etc.

At block 670 the autonomous yard truck 105 may autonomously drive along the second path toward the specific location.

Figure 7:
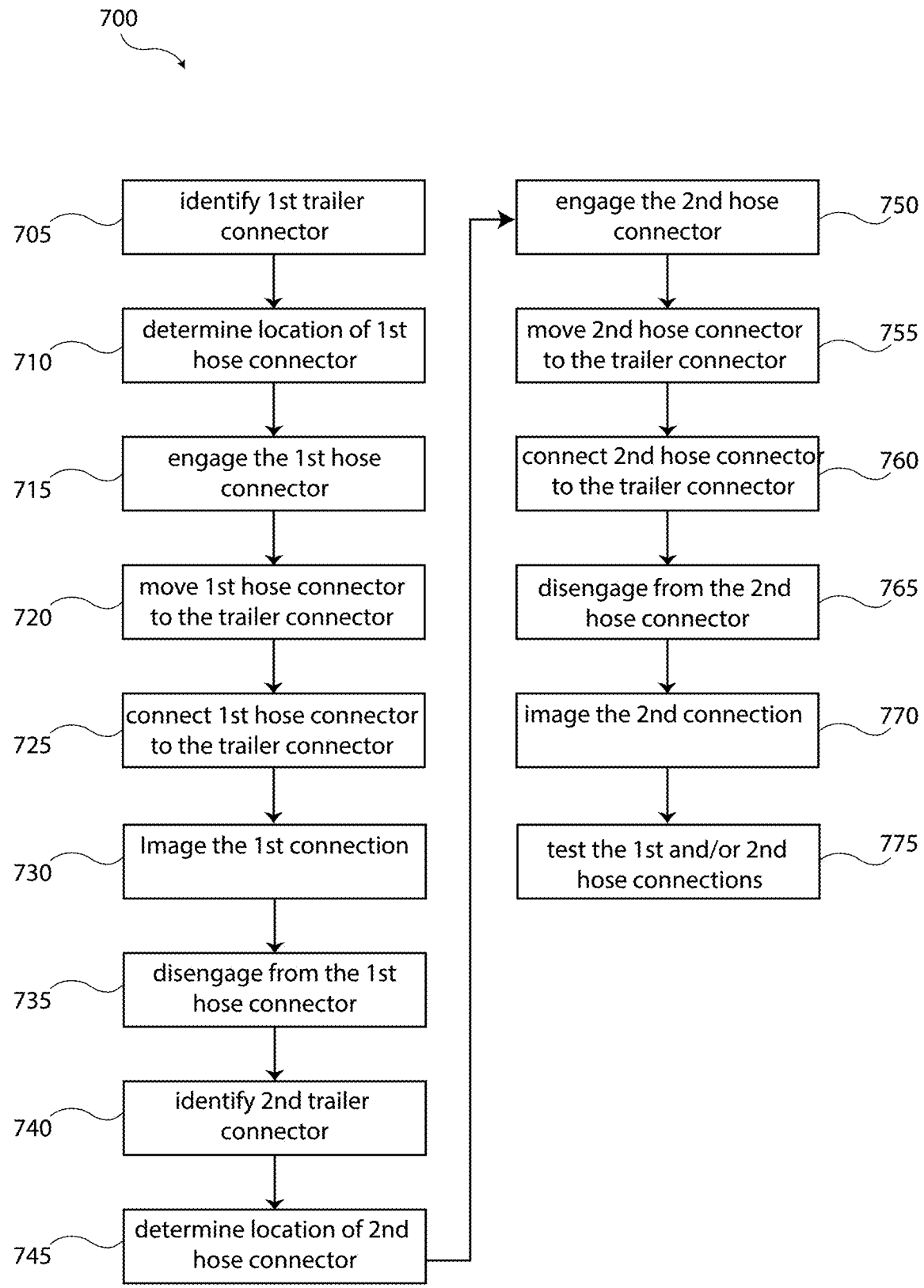
FIG. 7 is a flowchart of a process for operating an autonomous yard truck according to some embodiments.

FIG. 7 is a flowchart of a process 700 for operating an autonomous yard truck or more specifically a robotic arm coupled with an autonomous yard truck 105 according to some embodiments. The process 700 may, for example, include more or fewer blocks than shown. In addition, the blocks of process 700 may be performed in any order, some blocks may be performed at the same time, and/or one or more blocks may be removed or not performed. Furthermore, one or more additional blocks or processes may occur between the blocks or in addition to one or more blocks. The blocks of process 700 may be executed by the same or different components, controllers, systems, etc. that may or may not be working together.

The process 700 may begin at block 705 the first trailer connector is identified. For example, the robotic arm controller 140 may instruct the arm sensor 245 to scan the front of the trailer 260 such as, for example, by optically scanning the front of the trailer. The arm sensor 245 may identify the first trailer connector based on shape and/or color recognition techniques. Various other identification techniques may be used. Data from the arm sensor 245, for example, may be processed to filter environmental lighting defects such as, for example, lack of light, full sunlight, shade conditions, rain or snow conditions, etc. or other lighting effects.

At block 710, the location of a first hose connector on the autonomous yard truck 105 may be determined. For example, the robotic arm controller 140 may instruct the arm sensor 245 to scan the back of the autonomous yard truck 105 such as, for example, by optically scanning the back of the autonomous yard truck 105. The arm sensor 245 may identify the first trailer connector based on shape and/or color recognition techniques. Various other identification techniques may be used.

As another example, the robotic arm controller 140 may have the location of the first hose connector stored in memory. For example, the robotic arm controller 140 may store in memory the position and/or angles of the robotic arm when the robotic arm placed the first hose connector in a connector rack.

At block 715, the first hose connector may be engaged by the robotic arm.

At block 720, the first hose connector may be moved from the first hose connector location to a first trailer hose connector location on the trailer 260 with the robotic arm.

At block 725, the first hose connector may be connected with the first trailer hose connector.

At block 730, the connection between the first hose connector and the first trailer hose connector may be imaged such as, for example, by the arm sensor 245.

At block 735, the robotic arm may disengage from the first hose connector.

At block 740 the second trailer connector may be identified. For example, the robotic arm controller 140 may instruct the arm sensor 245 to scan the front of the trailer 260 such as, for example, by optically scanning the front of the trailer. The arm sensor 245 may identify the second trailer connector based on shape and/or color recognition techniques. Various other identification techniques may be used. In some embodiments, block 740 may be completed at the same time as block 705.

At block 745, the location of a second hose connector on the autonomous yard truck 105 may be determined. For example, the robotic arm controller 140 may instruct the arm sensor 245 to scan the back of the autonomous yard truck 105 such as, for example, by optically scanning the back of the autonomous yard truck 105. The arm sensor 245 may identify the second trailer connector based on shape and/or color recognition techniques. Various other identification techniques may be used.

As another example, the robotic arm controller 140 may have the location of the second hose connector stored in memory. For example, the robotic arm controller 140 may store in memory the position and/or angles of the robotic arm when the robotic arm placed the second hose connector in a connector rack.

In some embodiments, block 745 may be completed at the same time as block 710.

At block 750, the second hose connector may be engaged by the robotic arm.

At block 755, the second hose connector may be moved from the second hose connector location to a second trailer hose connector location on the trailer 260 with the robotic arm.

At block 760, the second hose connector may be connected with the second trailer hose connector.

At block 765, the robotic arm may disengage from the second hose connector. In some embodiments, the robotic arm may not be disengaged and the robotic arm may remain attached with the second hose connector (or the first hose connector) while the autonomous yard truck pulls the trailer.

At block 770, the connection between the second hose connector and the second trailer hose connector may be imaged such as, for example, by the arm sensor 245.

At block 775, the connection between the second hose connector and the second trailer hose connector and/or the connection between the first hose connector and the first trailer hose connector may be tested. For example, the braking control system 112 may be instructed to engage the braking lines to test the connection between the second hose connector and the second trailer hose connector and/or the connection between the first hose connector and the first trailer hose connector.

Figure 8:
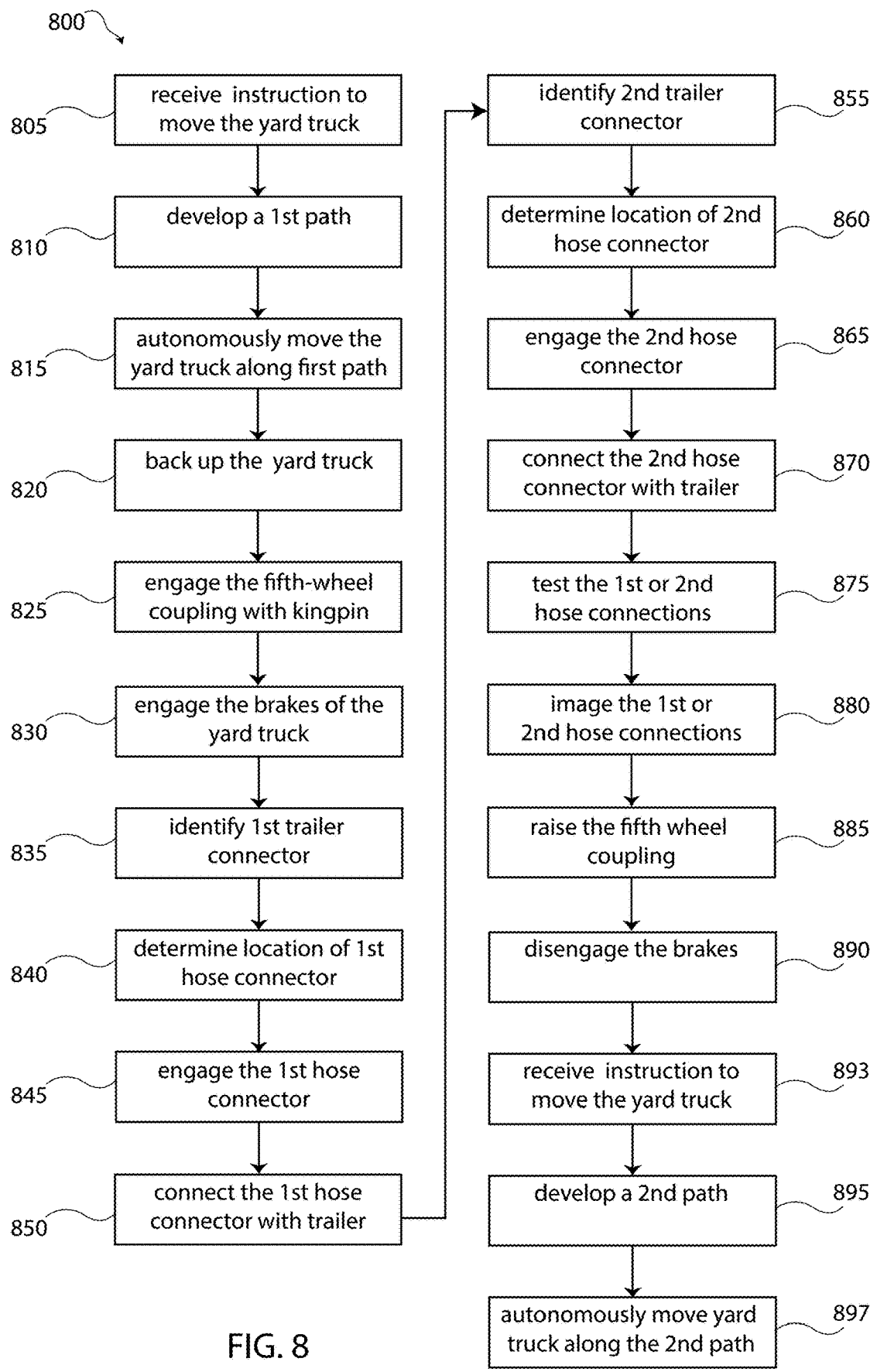
FIG. 8 is a flowchart of a process for operating an autonomous yard truck according to some embodiments.

FIG. 8 is a flowchart of a process 800 for operating an autonomous yard truck according to some embodiments. The process 800 may, for example, include more or fewer blocks than shown. In addition, the blocks of process 800 may be performed in any order, some blocks may be performed at the same time, and/or one or more blocks may be removed or not performed. Furthermore, one or more additional blocks or processes may occur between the blocks or in addition to one or more blocks. The blocks of process 800 may be executed by the same or different components, controllers, systems, etc. that may or may not be working together.

The process 800 may begin at block 805 where the autonomous yard truck 105 receives an instruction to move the autonomous yard truck toward a specific trailer. The instruction, for example, may be received from the base station 160 or from a remote location. The instruction, for example, may be received at the base station 160 and/or at the autonomous yard truck 105.

At block 810, a first path may be developed for the autonomous yard truck 105 to follow toward the specific trailer that takes into account the geometry of the autonomous yard truck. For example, the first path may take into account that the autonomous yard truck 105 is not coupled with a trailer and may have a shorter turning radius, may travel at higher speeds, may accelerate more quickly, etc. The first path may be developed at the base station 160 or at the autonomous yard truck 105. The first path may place the autonomous yard truck 105 in front of a trailer.

At block 815 the autonomous yard truck 105 may autonomously drive along the first path toward the specific trailer.

At block 820, the autonomous yard truck 105 may back up toward the specific trailer. In some embodiments, the autonomous yard truck 105 may back up toward the trailer autonomously. In some embodiments, the autonomous yard truck 105 may be backed up toward the trailer via teleoperation from a user at the base station 160.

At block 825 the fifth-wheel coupling of the autonomous yard truck may be coupled with the kingpin of the specific trailer.

At block 830, the brakes of the autonomous yard truck 105 may be engaged. In some embodiments, instruction may be sent from the controller 110 to the braking control system 112 to engage the brakes of the autonomous yard truck 105.

At block 835 the first trailer connector is identified. For example, the robotic arm controller 140 may instruct the arm sensor 245 to scan the front of the trailer 260 such as, for example, by optically scanning the front of the trailer. The arm sensor 245 may identify the first trailer connector based on shape and/or color recognition techniques. Various other identification techniques may be used.

At block 840, the location of a first hose connector on the autonomous yard truck 105 may be determined. For example, the robotic arm controller 140 may instruct the arm sensor 245 to scan the back of the autonomous yard truck 105 such as, for example, by optically scanning the back of the autonomous yard truck 105. The arm sensor 245 may identify the first trailer connector based on shape and/or color recognition techniques. Various other identification techniques may be used.

As another example, the robotic arm controller 140 may have the location of the first hose connector stored in memory. For example, the robotic arm controller 140 may store in memory the position and/or angles of the robotic arm when the robotic arm placed the first hose connector in a connector rack.

At block 845, the first hose connector may be engaged by the robotic arm. In some embodiments, the first hose connector may be moved from the first hose connector location to a first trailer hose connector location on the trailer 260 with the robotic arm.

At block 850, the first hose connector may be connected with the first trailer hose connector. In some embodiments, the connection between the first hose connector and the first trailer hose connector may be imaged such as, for example, by the arm sensor 245. In some embodiments, the robotic arm may disengage from the first hose connector. In other embodiments, the robotic arm may not be disengaged from the first hose connector.

At block 855 the second trailer connector may be identified. For example, the robotic arm controller 140 may instruct the arm sensor 245 to scan the front of the trailer 260 such as, for example, by optically scanning the front of the trailer. The arm sensor 245 may identify the second trailer connector based on shape and/or color recognition techniques. Various other identification techniques may be used. In some embodiments, block 855 may be completed at the same time as block 835.

At block 860, the location of a second hose connector on the autonomous yard truck 105 may be determined. For example, the robotic arm controller 140 may instruct the arm sensor 245 to scan the back of the autonomous yard truck 105 such as, for example, by optically scanning the back of the autonomous yard truck 105. The arm sensor 245 may identify the second trailer connector based on shape and/or color recognition techniques. Various other identification techniques may be used.

As another example, the robotic arm controller 140 may have the location of the second hose connector stored in memory. For example, the robotic arm controller 140 may store in memory the position and/or angles of the robotic arm when the robotic arm placed the second hose connector in a connector rack.

In some embodiments, block 745 may be completed at the same time as block 840.

At block 865, the second hose connector may be engaged by the robotic arm. In some embodiments, the second hose connector may be moved from the second hose connector location to a second trailer hose connector location on the trailer 260 with the robotic arm.

At block 870, the second hose connector may be connected with the second trailer hose connector. In some embodiments, the connection between the second hose connector and the second trailer hose connector may be imaged such as, for example, by the arm sensor 245. In some embodiments, the robotic arm may disengage from the second hose connector. In other embodiments, the robotic arm may not be disengaged from the second hose connector.

At block 875, the connection between the second hose connector and the second trailer hose connector and/or the connection between the first hose connector and the first trailer hose connector may be tested. For example, the braking control system 112 may be instructed to engage the braking lines to test the connection between the second hose connector and the second trailer hose connector and/or the connection between the first hose connector and the first trailer hose connector.

At block 880, the connection between the second hose connector and the second trailer hose connector and/or the connection between the first hose connector and the first trailer hose connector may be imaged such as, for example, by the arm sensor 245.

At block 885, the fifth-wheel coupling may be raised. In some embodiments, the controller 110 may send instructions to the autonomous yard truck 105 to raise the fifth-wheel coupling.

At block 890, the brakes of. the autonomous yard truck 105 may be disengaged. In some embodiments, instruction may be sent from the controller 110 to the braking control system 112 to disengage the brakes of the autonomous yard truck 105.

At block 893 the autonomous yard truck 105 receives an instruction to move the autonomous yard truck 105 and the trailer 260 toward a specific location. The instruction, for example, may be received from the base station 160 or from a remote location. The instruction, for example, may be received at the base station 160 and/or at the autonomous yard truck 105.

At block 895, a second path may be developed for the autonomous yard truck 105 and the trailer 260 to follow toward the specific location that takes into account the geometry of the autonomous yard truck coupled with the trailer 260. For example, the second path may take into account that the autonomous yard truck 105 is coupled with a trailer and may have a wider turning radius, may travel at lower speeds, may accelerate less quickly, etc. The second path may be developed at the base station 160 or at the autonomous yard truck 105. The second path may place the autonomous yard truck 105 at a location where the trailer 260 is being stored, loaded, transferred, etc.

At block 897 the autonomous yard truck 105 may autonomously drive along the second path toward the specific location.

Figure 9:
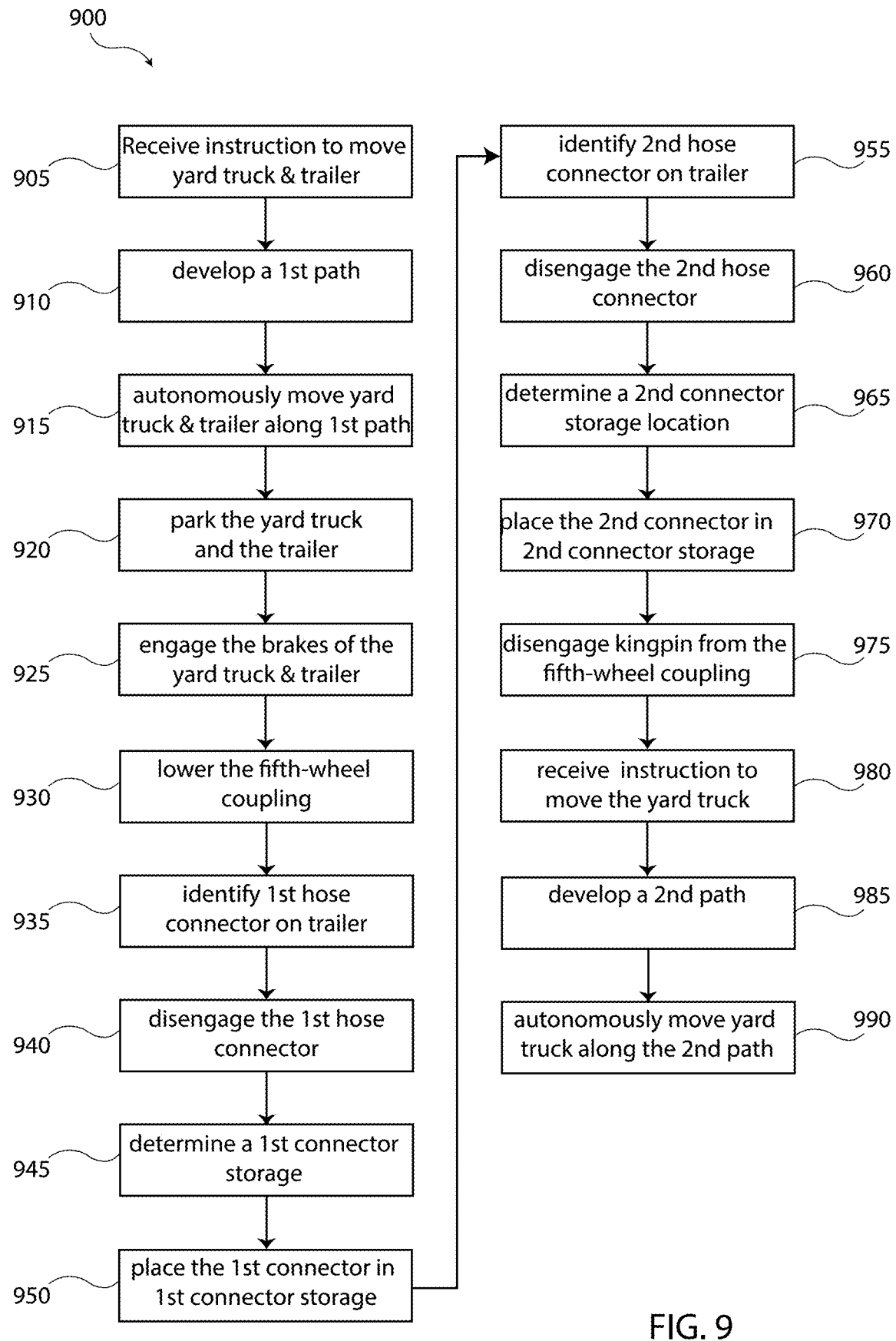
FIG. 9 is a flowchart of a process for operating an autonomous yard truck according to some embodiments.

FIG. 9 is a flowchart of a process 900 for operating an autonomous yard truck according to some embodiments. The process 900 may, for example, include more or fewer blocks than shown. In addition, the blocks of process 900 may be performed in any order, some blocks may be performed at the same time, and/or one or more blocks may be removed or not performed. Furthermore, one or more additional blocks or processes may occur between the blocks or in addition to one or more blocks. The blocks of process 900 may be executed by the same or different components, controllers, systems, etc. that may or may not be working together.

The process 900 may start at block 905, where an instruction to move the autonomous yard truck with a trailer toward a location is received. The instruction, for example, may be received from the base station 160 or from a remote location. The instruction, for example, may be received at the base station 160 and/or at the autonomous yard truck 105.

At block 910, a first path may be developed for the autonomous yard truck 105 and the trailer 260 to follow toward a specific location that takes into account the geometry of the autonomous yard truck 105 and the trailer 260. For example, the first path may take into account that the autonomous yard truck 105 is coupled with the trailer 260 and may have a larger turning radius, may travel at lower speeds, may accelerate less quickly, etc. The first path may be developed at the base station 160 or at the autonomous yard truck 105. The first path may place the autonomous yard truck 105 at the specific location.

At block 915 the autonomous yard truck 105 and the trailer 260 may autonomously drive along the first path toward the specific location.

At block 920, the autonomous yard truck 105 and the trailer 260 may be parked at the specific location.

At block 925, the brakes of the autonomous yard truck 105 may be engaged. In some embodiments, instruction may be sent from the controller 110 to the braking control system 112 to engage the brakes of the autonomous yard truck 105.

At block 930, the fifth-wheel coupling may be lowered. In some embodiments, the controller 110 may send instructions to the autonomous yard truck 105 to lower the fifth-wheel coupling.

At block 935 the first trailer hose connector location on the trailer may be identified.

The robotic arm may be moved to the first trailer hose connector location.

At block 940, the first hose connector may be disengaged from the first trailer hose connector with the robotic arm.

At block 945 a storage location for the first hose connector on the autonomous yard truck 105 may be determined.

At block 950, the first hose connector may be stored in the first connector storage location.

At block 955 the second trailer hose connector location on the trailer may be identified. The robotic arm may be moved to the second trailer hose connector location. This block may occur in conjunction with block 935.

At block 960, the second hose connector may be disengaged from the second trailer hose connector with the robotic arm. In some embodiments, the robotic arm may not be disengaged and the robotic arm may remain attached with the second hose connector (or the first hose connector) while the autonomous yard truck pulls the trailer.

At block 965 a storage location for the second hose connector on the autonomous yard truck 105 may be determined. This block may occur in conjunction with block 945.

At block 970, the second hose connector may be stored in the second connector storage location.

At block 975 the autonomous yard truck 105 may be disengaged from the kingpin of the trailer 260.

At block 980 the autonomous yard truck 105 may receive an instruction to move the autonomous yard truck 105 without the trailer 260 toward a specific location. The instruction, for example, may be received from the base station 160 or from a remote location. The instruction, for example, may be received at the base station 160 and/or at the autonomous yard truck 105.

At block 985, a second path may be developed for the autonomous yard truck 105 without the trailer 260 to follow toward the specific location that takes into account the geometry of the autonomous yard truck without the trailer 260. For example, the second path may take into account that the autonomous yard truck 105 is coupled with a trailer and may have a smaller turning radius, may travel at higher speeds, may accelerate more quickly, etc. The second path may be developed at the base station 160 or at the autonomous yard truck 105.

At block 990 the brakes may be released and/or the autonomous yard truck 105 may autonomously drive along the second path toward the specific location.

Figure 10:
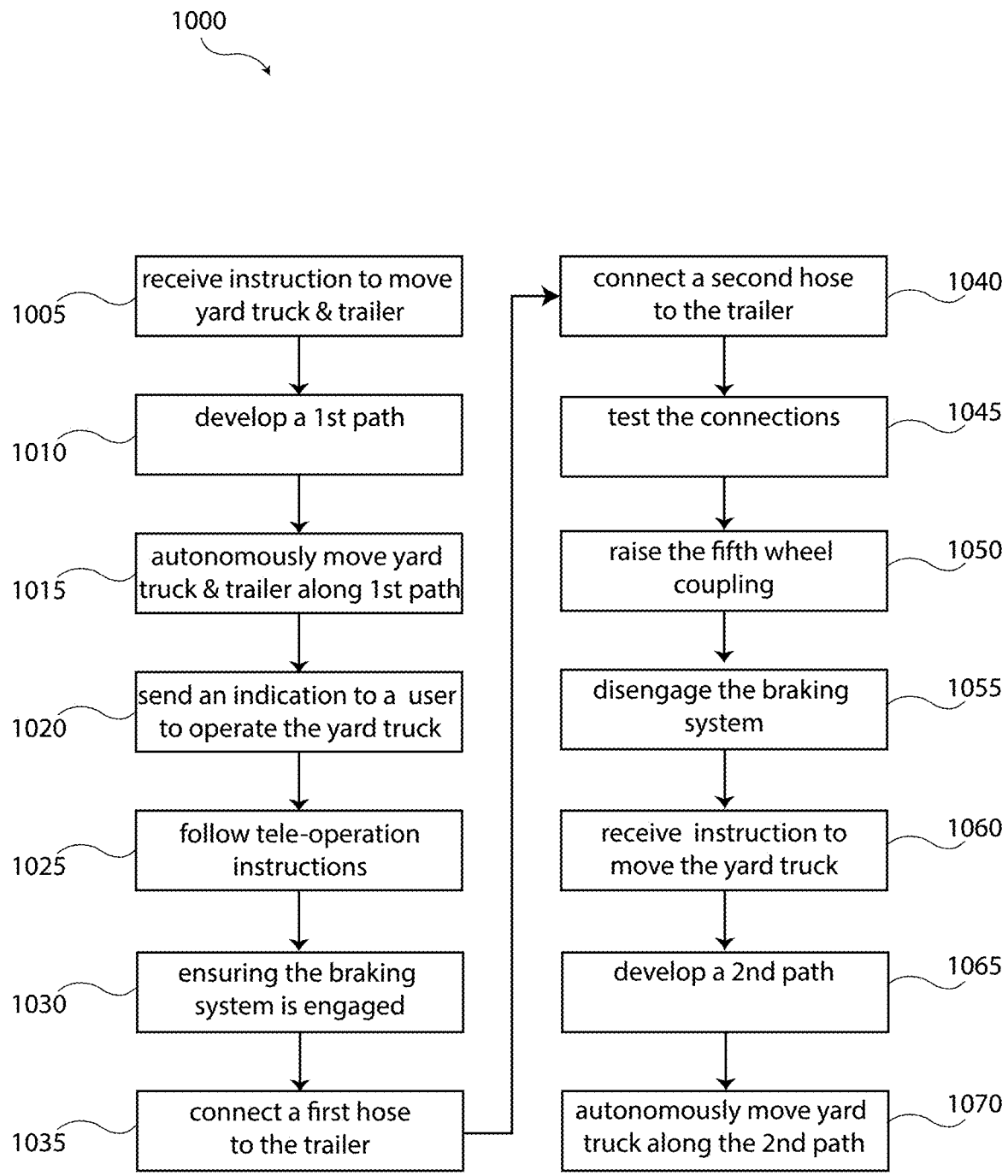
FIG. 10 is a flowchart of a process for operating an autonomous yard truck according to some embodiments.

FIG. 10 is a flowchart of a process 1000 for operating an autonomous yard truck according to some embodiments. The process 1000 may, for example, include more or fewer blocks than those that are shown. In addition, the blocks of process 1000 may be performed in any order. The blocks of process 1000 may be executed by the same or different components, controllers, systems, etc. that may be working together.

The process 1000 may begin at block 1005 where the autonomous yard truck 105 receives an instruction to move the autonomous yard truck toward a specific trailer. The instruction, for example, may be received from the base station 160 or from a remote location. The instruction, for example, may be received at the base station 160 and/or at the autonomous yard truck 105.

At block 1010, a first path may be developed for the autonomous yard truck 105 to follow toward the specific trailer that takes into account the geometry of the autonomous yard truck. For example, the first path may take into account that the autonomous yard truck 105 is not coupled with a trailer and may have a shorter turning radius, may travel at higher speeds, may accelerate more quickly, etc. The first path may be developed at the base station 160 or at the autonomous yard truck 105. The first path may place the autonomous yard truck 105 in front of a trailer.

At block 1015 the autonomous yard truck 105 may autonomously drive along the first path toward the specific trailer.

At block 1020, an indication may be sent to a user to operate the autonomous yard truck 105 such as, for example, via teleoperation from the base station 160.

At block 1025, the autonomous yard truck 105 may follow the teleoperation instruction. For example, the teleoperation instructions may backup the yard truck and engage the fifth-wheel coupling with the kingpin.

At block 1030, the autonomous yard truck 105 may engage the brakes.

At block 1035 a first hose may be connected to the trailer 260.

At block 1040 a second hose may be connected to the trailer 260.

At block 1045 the connection between the first hose connector and the first trailer hose connector and/or test the connection between the second hose connector and the second trailer hose connector may be tested. In some embodiments, instruction may be sent from the controller 110 to the braking control system 112 to test the connection between the first hose connector and the first trailer hose connector and/or test the connection between the second hose connector and the second trailer hose connector.

At block 1050, the fifth-wheel coupling may be raised. In some embodiments, the controller 110 may send instructions to the autonomous yard truck 105 to raise the fifth-wheel coupling.

At block 1055, the brakes of the autonomous yard truck 105 may be disengaged. In some embodiments, instruction may be sent from the controller 110 to the braking control system 112 to disengage the brakes of the autonomous yard truck 105.

At block 1060 the autonomous yard truck 105 receives an instruction to move the autonomous yard truck 105 and the trailer 260 toward a specific location. The instruction, for example, may be received from the base station 160 or from a remote location. The instruction, for example, may be received at the base station 160 and/or at the autonomous yard truck 105.

At block 1065, a second path may be developed for the autonomous yard truck 105 and the trailer 260 to follow toward the specific location that takes into account the geometry of the autonomous yard truck coupled with the trailer 260. For example, the second path may take into account that the autonomous yard truck 105 is coupled with a trailer and may have a wider turning radius, may travel at lower speeds, may accelerate less quickly, etc. The second path may be developed at the base station 160 or at the autonomous yard truck 105. The second path may place the autonomous yard truck 105 at a location where the trailer 260 is being stored, loaded, transferred, etc.

At block 1070 the autonomous yard truck 105 may autonomously drive along the second path toward the specific location.

Figure 11:
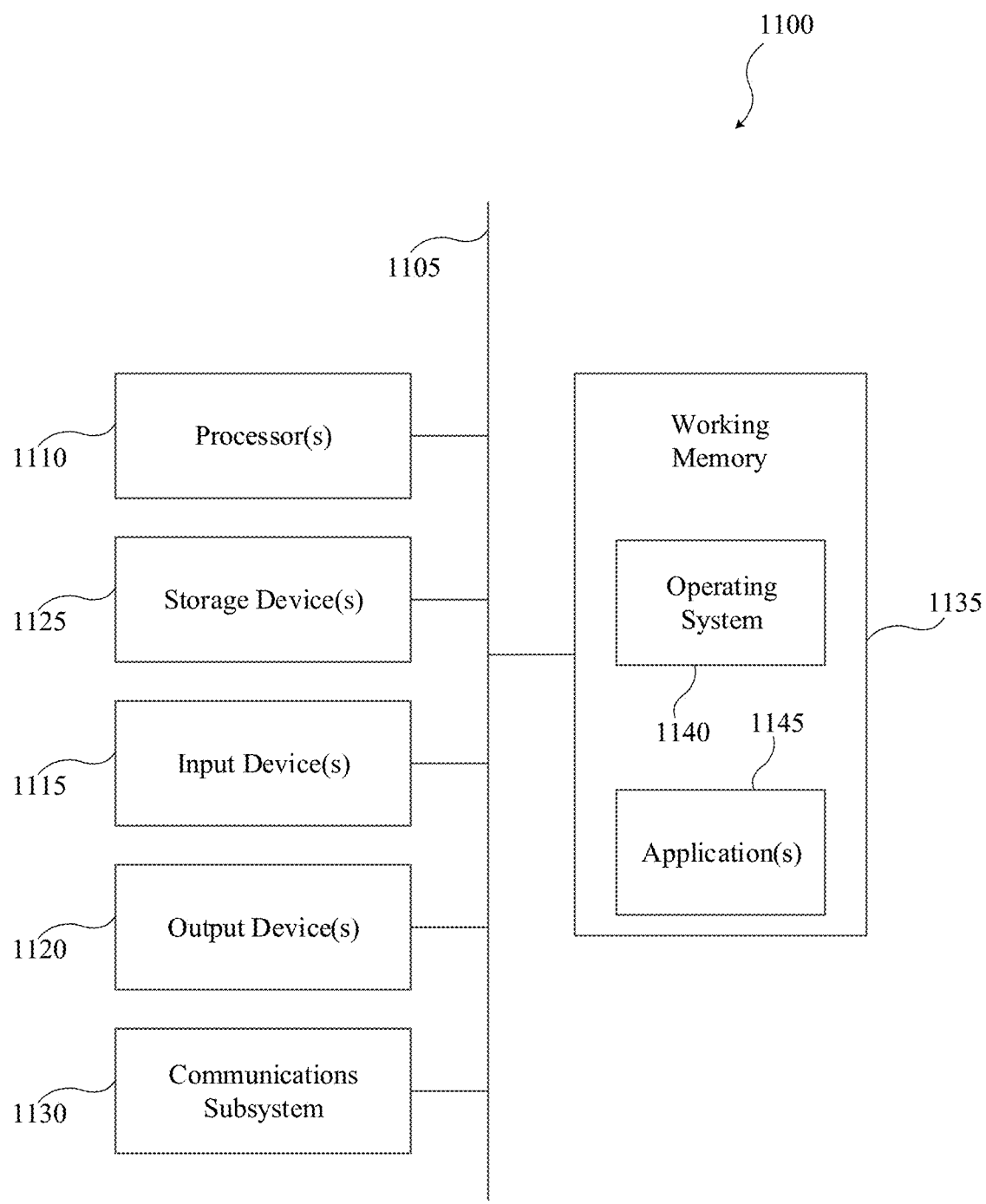
FIG. 11 is a block diagram of a computational system that can be used to with or to perform some embodiments described in this document.

The computational system 1100, shown in FIG. 11 can be used to perform any of the embodiments of the invention. For example, computational system 1100 can be used to execute process 600, 700, 800, 900, or 1000. As another example, computational system 1100 can be used perform any calculation, identification and/or determination described here. Computational system 1100 includes hardware elements that can be electrically coupled via a bus 1105 (or may otherwise be in communication, as appropriate). The hardware elements can include one or more processors 1110, including without limitation one or more general-purpose processors and/or one or more special-purpose processors (such as digital signal processing chips, graphics acceleration chips, and/or the like); one or more input devices 1115, which can include without limitation a mouse, a keyboard and/or the like; and one or more output devices 1120, which can include without limitation a display device, a printer and/or the like.

The computational system 1100 may further include (and/or be in communication with) one or more storage devices 1125, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1100 might also include a communications subsystem 1130, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 1130 may permit data to be exchanged with a network (such as the network described below, to name one example), and/or any other devices described in this document. In many embodiments, the computational system 1100 will further include a working memory 1135, which can include a RAM or ROM device, as described above.

The computational system 1100 also can include software elements, shown as being currently located within the working memory 1135, including an operating system 1140 and/or other code, such as one or more application programs 1145, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1125 described above.

In some cases, the storage medium might be incorporated within the computational system 1100 or in communication with the computational system 1100. In other embodiments, the storage medium might be separate from a computational system 1100 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1100 and/or might take the form of source and/or installable code, which, upon compilation and/or installation on the computational system 1100 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method for operating an autonomous yard truck, the method comprising:
    receiving an instruction to move the autonomous yard truck toward a specific trailer;
    developing a first path for the autonomous yard truck to follow from a first location to the specific trailer through a work area that takes into account the geometry of the autonomous yard truck, wherein the first path has a first turning radius requirement and a first speed requirement;
    after developing the first path, autonomously driving the autonomous yard truck along the first path to the specific trailer;
    backing up the autonomous yard truck toward the specific trailer;
    engaging a fifth-wheel coupling of the autonomous yard truck with a kingpin of the specific trailer;
    engaging brakes of the autonomous yard truck;
    deploying a deployable shade, wherein the deployable shade is coupled with a portion of a cab of the autonomous yard truck, and wherein the deployable shade screens sunlight from one or more sensors when deployed;
    identifying a first trailer hose connector location on the specific trailer;
    determining the location of a first hose connector on the autonomous yard truck;
    engaging the first hose connector with a robotic arm;
    moving the first hose connector from the first hose connector location to the first trailer hose connector location on the specific trailer with the robotic arm;
    connecting the first hose connector with the first trailer hose connector;
    testing the connection between the first hose connector and the first trailer hose connector;
    raising a fifth-wheel coupling;
    releasing the brakes;
    receiving an instruction to move the autonomous yard truck and the specific trailer to a second location;
    developing a second path for the autonomous yard truck and the specific trailer to follow from yard truck's current position at the specific trailer to the second location through the work area, wherein the second path is developed to take into account at least the geometry of the yard truck and the geometry of the specific trailer, wherein the second path has a second turning radius requirement that is wider than the first turning radius requirement and a second speed requirement that is slower than the first speed requirement; and after developing the second path, autonomously driving the autonomous yard truck with the specific trailer along the second path to the location.

2. The method according to claim 1, further comprising disengaging the first hose connector from the robotic arm.

3. The method according to claim 1, further comprising imaging the connection between the first hose connector and the first trailer hose connector.

4. The method according to claim 1, further comprising:
identifying a second trailer hose connector location on the specific trailer;
determining a location of a second hose connector on the autonomous yard truck;
engaging the second hose connector on the autonomous yard truck with the robotic arm;
moving the second hose connector from the second hose connector location to the second trailer hose connector location on the specific trailer with the robotic arm;
connecting the second hose connector with the second trailer hose connector;
imaging the connection between the second hose connector and the second trailer hose connector;
disengaging the second hose connector from the robotic arm; and
testing the connection between the second hose connector and the second trailer hose connector.

5. The method according to claim 1, wherein backing up the autonomous yard truck to the specific trailer occurs autonomously.

6. An autonomous yard truck comprising:
a cab;
a deck coupled with the cab;
a speed control mechanism;
a steering system;
a geolocation sensor that produces autonomous yard truck geolocation data;
a plurality of sensors positioned on the autonomous yard truck;
a fifth wheel coupling;
a robotic arm disposed on the deck;
an air hose with a first hose connector;
a deployable shade coupled with the cab of the autonomous yard truck, and wherein the deployable shade screens sunlight from one or more sensors of the plurality of sensors when deployed;
a transceiver that communicates with and receives data from at least a base station; and
a controller communicatively coupled with the speed control mechanism, the steering system, the geolocation sensor, the plurality of sensors, the robotic arm, and the transceiver, wherein the controller has code that:
receives an instruction to move the autonomous yard truck to a specific trailer;
develops a first path for the autonomous yard truck to follow from a first location to the specific trailer through a work area that takes into account the geometry of the autonomous yard truck, wherein the first path has a first turning radius requirement and a first speed requirement;
after developing the first path, autonomously drives the autonomous yard truck along the first path to the specific trailer;
engages the fifth-wheel coupling of the autonomous yard truck with a kingpin of the specific trailer;
engages brakes of the autonomous yard truck;
deploys the deployable shade;
identifies a first trailer hose connector location on the specific trailer;
determines the location of the first hose connector on the autonomous yard truck;
engages the first hose connector with the robotic arm;
moves the first hose connector from the first hose connector location to the first trailer hose connector location on the specific trailer with the robotic arm;
connects the first hose connector with the first trailer hose connector;
tests the connection between the first hose connector and the first trailer hose connector;
raises the fifth-wheel coupling;
releases the brakes;
receives an instruction to move the autonomous yard truck and the specific trailer to a second location;
develops a second path for the autonomous yard truck and the specific trailer to follow from the yard truck's position at the trailer to the second location through the work area, wherein the second path is developed to take into account at least the geometry of the yard truck and the geometry of the specific trailer, wherein the second path has a second turning radius requirement that is wider than the first turning radius requirement and a second speed requirement that is slower than the first speed requirement; and
after developing the second path, autonomously drives the autonomous yard truck pulling the specific trailer along the second path to the location.

7. The autonomous yard truck according to claim 6, wherein the controller has code that disengages the first hose connector from the robotic arm.

8. The autonomous yard truck according to claim 6, wherein the controller has code that backs up the autonomous yard truck to the specific trailer.

9. The autonomous yard truck according to claim 6, wherein the controller has code that:
identifies a second trailer hose connector location on the specific trailer;
determines the location of a second hose connector on the autonomous yard truck;
engages the second hose connector on the autonomous yard truck with the robotic arm;
moves the second hose connector from the second hose connector location to the second trailer hose connector location on the specific trailer with the robotic arm;
connects the second hose connector with the second trailer hose connector;
images the connection between the second hose connector and the second trailer hose connector; and
tests the connection between the second hose connector and the second trailer hose connector.

10. The autonomous yard truck according to claim 9, wherein the controller has code that disengages the second hose connector from the robotic arm.

11. The autonomous yard truck according to claim 6, wherein the controller has code that images the connection between the first hose connector and the first trailer hose connector.

* * * * *